(12) United States Patent
Bahrs et al.

(10) Patent No.: US 8,676,902 B2
(45) Date of Patent: Mar. 18, 2014

(54) SYSTEM AND METHOD FOR SERVICE ORIENTED EMAIL CLIENT APPLICATION

(75) Inventors: Peter C. Bahrs, Austin, TX (US); Roland Barcia, Leonia, NJ (US); Gang Chen, Syosset, NY (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/946,308

(22) Filed: Nov. 28, 2007

(65) Prior Publication Data

US 2009/0138561 A1 May 28, 2009

(51) Int. Cl.
*G06F 15/16* (2006.01)

(52) U.S. Cl.
USPC ........... 709/206; 709/219; 709/246; 709/250; 709/203; 709/217; 709/220; 709/202; 717/108; 717/172; 717/121; 717/123; 707/999.005; 707/999.107; 707/E17.014; 707/999.1; 707/999.101; 705/14.73; 705/26.4; 705/26.61; 705/27.1; 719/313; 719/315; 719/316; 719/317

(58) Field of Classification Search
USPC ........................................................ 709/206
See application file for complete search history.

(56) References Cited

U.S. PATENT DOCUMENTS

| | | | |
|---|---|---|---|
| 6,792,605 B1 * | 9/2004 | Roberts et al. | 719/313 |
| 7,350,191 B1 * | 3/2008 | Kompella et al. | 717/108 |
| 7,451,157 B2 * | 11/2008 | Kaler et al. | 1/1 |
| 7,516,094 B2 * | 4/2009 | Perkowski | 705/27 |
| 7,600,048 B2 * | 10/2009 | Guest | 709/250 |
| 7,870,201 B2 * | 1/2011 | Madams et al. | 709/206 |
| 7,962,470 B2 * | 6/2011 | Degenkolb et al. | 707/709 |
| 8,010,695 B2 * | 8/2011 | Savchenko et al. | 709/236 |
| 8,255,871 B1 * | 8/2012 | Kompella et al. | 717/108 |
| 2003/0033432 A1 * | 2/2003 | Simpson et al. | 709/246 |
| 2003/0220835 A1 * | 11/2003 | Barnes, Jr. | 705/14 |
| 2003/0233413 A1 * | 12/2003 | Becker | 709/206 |
| 2004/0054690 A1 * | 3/2004 | Hillerbrand et al. | 707/104.1 |
| 2004/0078424 A1 * | 4/2004 | Yairi et al. | 709/203 |
| 2004/0179142 A1 * | 9/2004 | Fang | 348/734 |
| 2005/0038693 A1 * | 2/2005 | Janus | 705/10 |
| 2005/0044197 A1 * | 2/2005 | Lai | 709/223 |
| 2005/0177602 A1 * | 8/2005 | Kaler et al. | 707/104.1 |
| 2006/0020679 A1 * | 1/2006 | Hinton et al. | 709/217 |
| 2006/0022048 A1 * | 2/2006 | Johnson | 235/462.1 |

(Continued)

FOREIGN PATENT DOCUMENTS

CN 1256568 A 6/2000

OTHER PUBLICATIONS

Newton, "Cross Registry Internet Service Protocol (CRISP) Requirements", Feb. 2004, VeriSign Inc.*

(Continued)

*Primary Examiner* — Krista Zele
*Assistant Examiner* — Ondrej Vostal
(74) *Attorney, Agent, or Firm* — Jeffrey T. Holman (57) ABSTRACT

A system to facilitate a service oriented email client application. The system includes a service registry, a service address book coupled to an email client, and an email composer coupled to the service address book. The service registry includes service information. The service information describes how to invoke a web service. The service address book includes a web service entry linked to the service information for the web service in the service registry. The email composer generates a user input form with a custom input field corresponding to the service information for the web service.

25 Claims, 10 Drawing Sheets

(56) References Cited

U.S. PATENT DOCUMENTS

| | | | |
|---|---|---|---|
| 2006/0100995 A1* | 5/2006 | Albornoz et al. | 707/3 |
| 2006/0253597 A1* | 11/2006 | Mujica | 709/229 |
| 2007/0005713 A1* | 1/2007 | LeVasseur et al. | 709/206 |
| 2007/0067403 A1* | 3/2007 | Holmes | 709/206 |
| 2007/0069896 A1* | 3/2007 | Boland et al. | 340/572.1 |
| 2007/0088807 A1* | 4/2007 | Moore | 709/217 |
| 2007/0094350 A1* | 4/2007 | Moore | 709/217 |
| 2007/0150299 A1* | 6/2007 | Flory | 705/1 |
| 2007/0156726 A1* | 7/2007 | Levy | 707/100 |
| 2007/0168436 A1* | 7/2007 | Andam | 709/206 |
| 2007/0169199 A1* | 7/2007 | Quinnell et al. | 726/25 |
| 2007/0255717 A1* | 11/2007 | Baikov et al. | 707/10 |
| 2008/0046369 A1* | 2/2008 | Wood | 705/50 |
| 2008/0134069 A1* | 6/2008 | Horvitz | 715/765 |
| 2008/0147802 A1* | 6/2008 | Abouzour et al. | 709/206 |
| 2008/0162498 A1* | 7/2008 | Omoigui | 707/10 |
| 2008/0263162 A1* | 10/2008 | Staiman et al. | 709/206 |
| 2008/0301009 A1* | 12/2008 | Plaster et al. | 705/28 |
| 2009/0055366 A1* | 2/2009 | Smith et al. | 707/4 |
| 2009/0083239 A1* | 3/2009 | Colgrave et al. | 707/4 |
| 2009/0106350 A1* | 4/2009 | Chen et al. | 709/203 |
| 2009/0125612 A1* | 5/2009 | Rabetge et al. | 709/220 |

OTHER PUBLICATIONS

Hull et al., "Tools for Composite Web Services: A Short Overview", 2005.*

Brose, "Securing Web Services with SOAP Security Proxies", 2003.*

Schattkowsky et al., "Peer-to-peer technology for interconnecting web services in heterogeneous networks", 2004.*

Weissman et al., "The Design of the Force.com Multitenant Internet Application Development Platform", 2009.*

Rahman et al., "Making frameworks more useable: using model introspection and metadata to develop model processing tools", 2003.*

* cited by examiner

SYSTEM AND METHOD FOR SERVICE ORIENTED EMAIL CLIENT APPLICATION

BACKGROUND OF THE INVENTION

Service Oriented Architecture (SOA) is an architectural design approach to define relationships between service producers and consumers. In a service oriented architecture environment, independent services are accessible to different consumers without requiring knowledge of the underlying platform implementations of the available services. Service oriented architecture introduced a new emerging computing standard, which allows the software components or systems to be exposed and consumed as loosely-coupled services. This technology gives the potential to extend the capability and primary functions of a conventional email system. In particular, service oriented architecture technology provides an ability to extend the functionality of a conventional email client.

Conventional email systems are primarily used for human-to-human communications. Conventional email systems do not support human-to-computer service applications. In applications that imitate human-to-computer service applications, email systems typically interface with a custom application programming interface (API) that has limited functionality tied to a particular service offering. While existing standards such as Simple Object Access Protocol (SOAP) and Simple Mail Transfer Protocol (SMTP) provide an infrastructure foundation for human-to-computer communications, conventional email systems do not take advantage of these and other standards to facilitate human-to-computer software services.

SUMMARY OF THE INVENTION

Embodiments of a system are described. In one embodiment, the system is a system to facilitate a service oriented email client application. An embodiment of the system includes a service registry, a service address book coupled to an email client, and an email composer coupled to the service address book. The service registry includes service information. The service information describes how to invoke a web service. The service address book includes a web service entry linked to the service information for the web service in the service registry. The email composer generates a user input form with a custom input field corresponding to the service information for the web service.

In some embodiments, the system also includes an email server coupled to the email client and an adapter coupled between the email server and a web service endpoint corresponding to the web service in the service registry. The email server receives a service request from the email client. The adapter receives the service request from the email client and communicates the service request to the web service endpoint. In some embodiments, the adapter is also configured to receive a synchronous reply from the web service endpoint and to communicate the synchronous reply to the email server for communication to the email client. The adapter may be a Simple Mail Transfer Protocol (SMTP) adapter or another type of email adapter. In some embodiments, the system accommodates an asynchronous service request.

In some embodiments, the system also includes a service data transformer coupled to the email composer. The service data transformer transforms a service request from the email composer into a message format compatible with the service information for the web service. In some embodiments, the system also includes a user interface controller coupled to the email composer. The user interface controller generates a graphical user interface for display on a display device. The graphical user interface directs a user to provide input according to the user input form with the custom input field corresponding to the service information for the web service. In some embodiments, the system also includes a service analyzer coupled to the email composer. The service analyzer analyzes the service information for the web service and determines the custom input field corresponding to the service information for the web service. In some embodiments, the system also includes a service registry cache coupled to the service address book. The service registry cache stores a map of the service information from the service registry in the service address book. The service address book may be local to the email client. In some embodiments, the email composer generates the user input form with a free text input field to allow a free text input corresponding to a service request for the web service in the service registry. Other embodiments of the system are also described.

Embodiments of a method are also described. In one embodiment, the method includes obtaining service information descriptive of invocation procedures for a web service. The service information includes metadata corresponding to a custom input field for the web service. The method also includes generating a custom user interface to facilitate user input according to the custom input field for the web service. The method also includes using an email protocol to invoke a service request for the web service based on the user input. Other embodiments of the method are also described.

Embodiments of an apparatus are also described. In one embodiment, the apparatus is a computer program product which includes a computer useable storage medium to store a computer readable program that, when executed on a computer, causes the computer to perform operations. In one embodiment, the operations include an operation to link a web address entry of an address book in an email client to service information from a service registry. The service information corresponds to a web service. The operations also include operations to generate a user input form with a custom input field corresponding to the service information for the web service and to invoke a service request for the web service via an email message according to user input via the custom input field of the user input form.

In another embodiment, the apparatus is an apparatus to facilitate an email client as a web service consumer. An embodiment of the apparatus includes means for mapping a service endpoint from a service registry into an email address book and means for automatically generating a custom email composer interface based on a service description of the service endpoint. The custom email composer interface includes a custom input field for user input of custom data specified by the service description. The apparatus also includes means for automatically transforming the custom data into a message format compatible with the service description and means for invoking a service request for the service endpoint over an email protocol. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments bridge the gap of how an email client system can be service aware and allow the users of the email client system to request heterogeneous services without knowing the particular details of the requested service. Some of the described embodiments include three technical components, namely, a service address book, a mapped service registry, and an email client. The service address book component of the system stores service registry information in the email client. The service registry contains the information (e.g., metadata) about a particular service. A user looks up a service from the service address book, which in turn connects to the mapped service registry and returns information about the requested service to the email client. The returned information contains the specific details of how and where to invoke the service.

Once the service description information is acquired, the email client analyzes the service information and invokes, or generates, an email composer. The email composer understands the format of the service message and the appropriate input form. Also, the generated email composer can transform the input provided by the user into a message format accepted by the service provider for the requested service. Other embodiments are also described below with specific reference to the corresponding figures.

Figure 1:
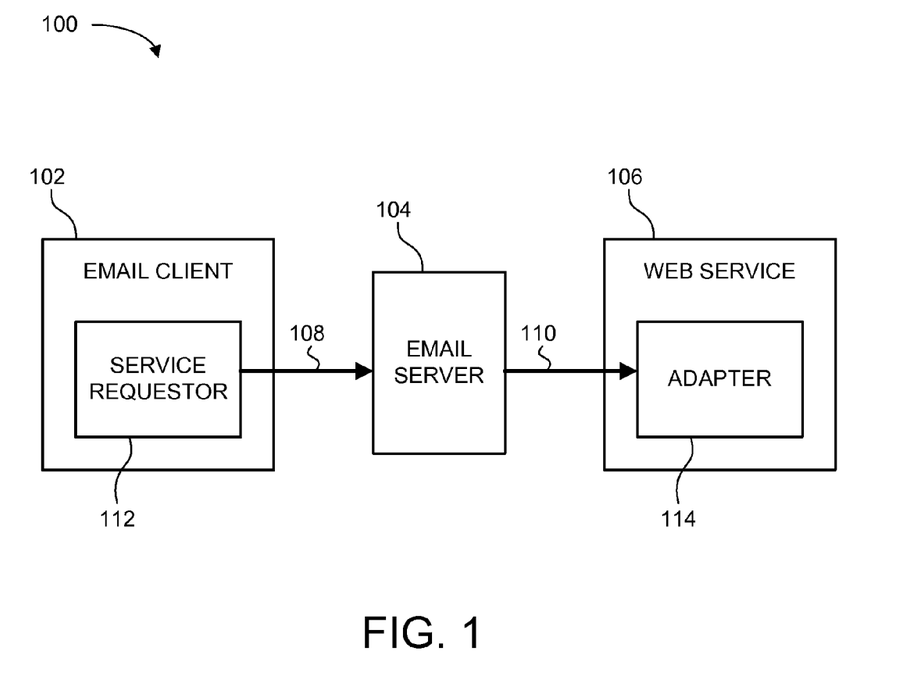
FIG. 1 depicts a schematic diagram of one embodiment of an asynchronous, service oriented email client application.

FIG. 1 depicts a schematic diagram of one embodiment of an asynchronous, service oriented email client application 100. The illustrated asynchronous, service oriented email client application 100 includes an email client 102, an email server 104, and a web service 106. The email client 102 is coupled to the email server 104 by a communication channel 108. Similarly, the email server 104 is coupled to the web service 106 by a communication channel 110. The communication channels 108 and 110 represent any combination of wired and/or wireless communication channels that establish any type of direct or networked communication path between the corresponding components.

The email client 102 includes a service requester 112 to invoke a service request. The service request is communicated by the service requester 112 to the email server 104 via an email protocol such as Simple Mail Transfer Protocol (SMTP) or another type of email protocol. The email server 104 then relays the service request from the email client 102 to the corresponding web service 106. In one embodiment, an adapter 114 (e.g., an SMTP adapter) associated with the web service 106 receives the service request from the email server 104. Since the service request, in this example, is an asynchronous service request, the adapter 114 communicates the service request to the web service 106, but a response from the web service 106 to the email client 102 is not necessarily provided and, if provided, may be communicated at a later time.

It should be noted that the depicted asynchronous, service oriented email client application 100 is not restrictive with respect to the type of email client 102, email server 104, or web service 106 that is implemented. The email client 102 may be any type of email client, and the email server 104 may be any type of email server. In other embodiments, the functionality of the email client 102 and the email server 104 may be combined in a single hardware implementation and/or software interface. Additionally, some embodiments of the asynchronous, service oriented email client application 100 may be implemented in conjunction with internet-based email systems.

Also, the adapter 114 may be any type of standard email adapter. Since the service requester 112 invokes a service request that is tailored to the requested web service 106, the adapter 114 does not necessarily have any custom software code or other customized design elements to facilitate an interface between the email client 102 and the web service 106. Although this description frequently references an exemplary SMTP adapter, other embodiments described herein may utilize other types of email adapters 114. Similarly, SMTP or other types of email protocols may be implemented within the various embodiments described herein.

Figure 2:
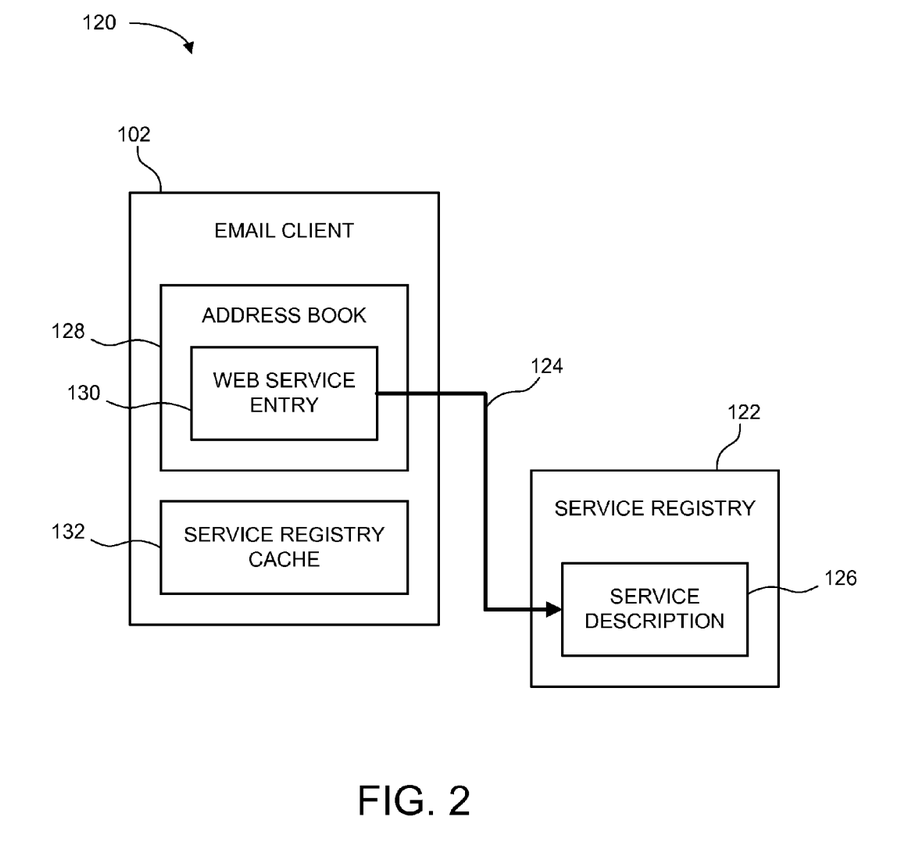
FIG. 2 depicts a schematic diagram of one embodiment of a web service mapping architecture for use in a service oriented email client application.

FIG. 2 depicts a schematic diagram of one embodiment of a web service mapping architecture 120 for use in a service oriented email client application. For example, the web service mapping architecture 120 may be used in the asynchronous, service oriented email client application 100 of FIG. 1. Other embodiments of the web service mapping architecture 120 may be implemented in other service oriented email client applications.

The illustrated web service mapping architecture 120 includes the email client 102 and a service registry 122. In one embodiment, the email client 102 is coupled to the service registry 122 by a communication channel 124 which is representative of various types of wired and/or wireless communication channels.

Figure 6:
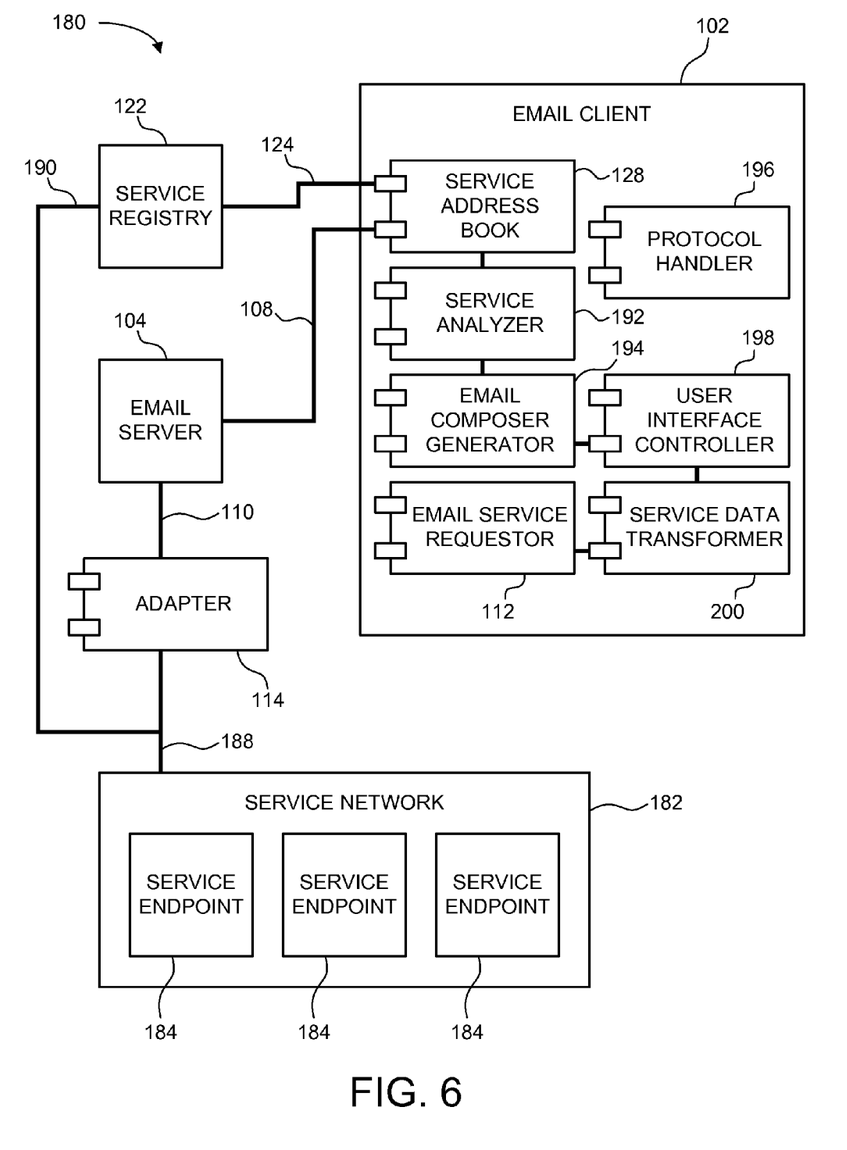
FIG. 6 depicts a schematic diagram of one embodiment of a service oriented email system.

In general, the service registry 122 includes a service description 126, or service information, for one or more web services 106. In particular, the service information of the service registry 122 includes metadata indicative of invocation procedures for one or more web services 106. The web services 106 correlate to one or more web service endpoints, which are shown in FIG. 6 and described in more detail below. Hence, the service information indicates how and where to invoke a particular web service 106. In one embodiment, the service registry 122 is stored in an electronic data storage device (not shown) remote from the email client 102.

The email client 102 is coupled to the service registry 122 to invoke a service request for the web service 106 of at least one of the web service endpoints. More specifically, the email client 102 invokes the service request using an email protocol. In order to facilitate the service request invocation, the email client 102 includes an address book 128. The address book 128 includes one or more web service entries 130, which are linked to the service information for the web services 106 in the service registry 122. In one embodiment, the web service entries 130 appear as contacts within the address book 128. However, the web service entries 130 are linked to corresponding service descriptions 126 in the service registry 122, rather than email addresses for conventional email recipients. Nevertheless, the address book 128 may store both email addresses and web service entries 130 within the same data structure. Alternatively, the web service entries 130 may be stored in a separate data structure from the email addresses used by the email client 102.

Additionally, the email client 102 may include a service registry cache 132. The service registry cache 132 stores a map of the service description 126, or service information, from the service registry 122 in the service address book 128. Alternatively, the service registry cache 132 is coupled to the address book 128. Although the service address book 128 is shown in FIG. 2 as being local to the email client 102, other embodiments may include an address book 128 that is remote from the email client 102.

Figure 3:
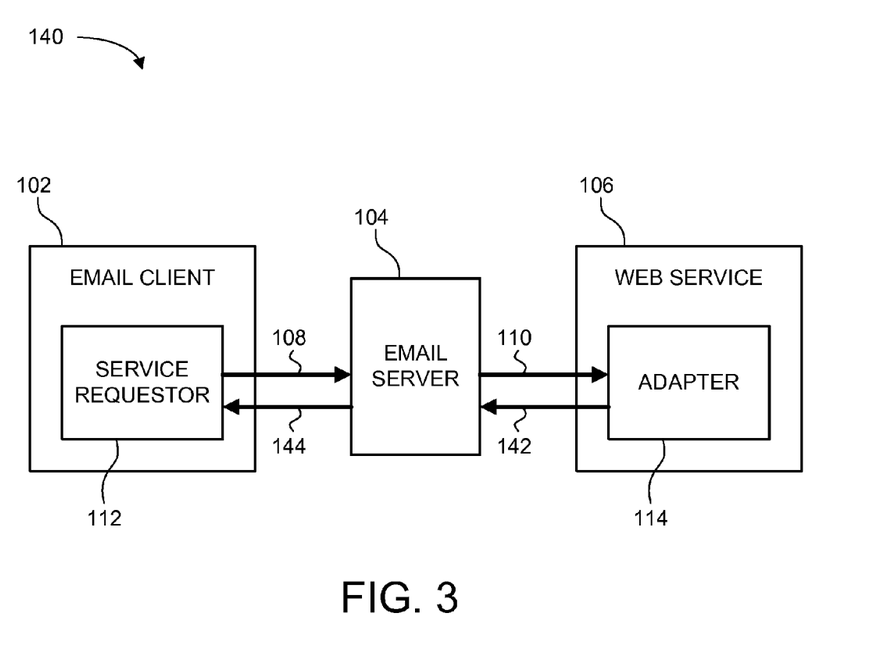
FIG. 3 depicts a schematic diagram of one embodiment of a synchronous, service oriented email client application.

FIG. 3 depicts a schematic diagram of one embodiment of a synchronous, service oriented email client application 140. In many aspects, the illustrated synchronous, service oriented email client application 140 is substantially similar to the asynchronous, service oriented email client application 100 of FIG. 1. Hence, similar structural components and/or functionality is not described further with respect to the synchronous, service oriented email client application 140.

In contrast to the asynchronous, service oriented email client application 100 of FIG. 1, the synchronous, service oriented email client application 140 of FIG. 3 facilitates a synchronous reply communication from the web service 106 to the email client 102. In particular, the adapter 114 sends a reply payload to the email server 104 over the reply communication channel 142 using an email protocol such as SMTP. The email server 104 then directs the reply payload to the email client 102 over the reply communication channel 144 using the email protocol. Although the reply communication channels 142 and 144 are shown as distinct communication channels from the communications channels 108 and 110, some embodiments of the synchronous, service oriented email client application 140 may use the same communication channels 108 and 110 for both the service request communication to the web service 106 and the reply payload to the email client 102.

Figure 4:
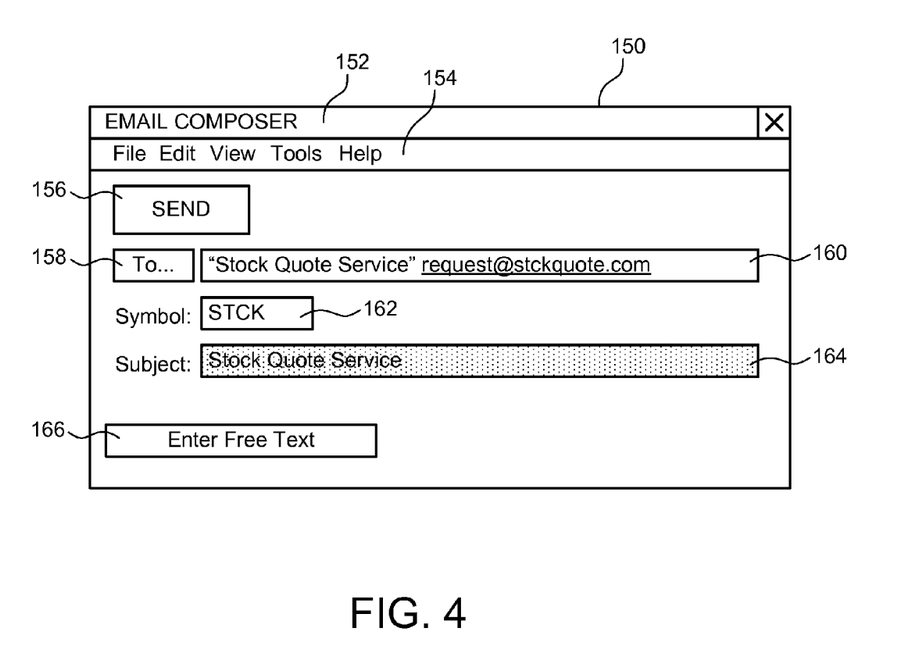
FIG. 4 depicts a schematic diagram of one embodiment of an email composer interface for use in a service oriented email client application.

FIG. 4 depicts a schematic diagram of one embodiment of an email composer interface 150 for use in a service oriented email client application. For example, the email composer interface 150 may be implemented in conjunction with the asynchronous, service oriented email client application 100 of FIG. 1 or the synchronous, service oriented email client application 140 of FIG. 3. Although the email composer interface 150 is shown and described as a graphical user interface (GUI), some embodiments of the email composer interface 150 may be implemented in other forms instead of as a GUI.

In general, the email composer interface 150 facilitates entry of data pertinent to a requested web service 106. In particular, the email composer interface 150 allows a user to input data that is specific to the requested web service 106, in accordance with the service description 126 corresponding to the requested web service 106.

In the illustrated embodiment, the email composer interface 150 includes a title bar 152 and a menu bar 154. The title bar 152 and the menu bar 154 function similar to conventional title and menu bars. The email composer interface 150 also includes a "send" button 156, a "to" button 158, and a "to" address input field 160. The send button 156 operates similar to conventional send buttons to transmit the email message from the email client 102 to the email server 104. The to button 158 allows the user to access the address book 128, for example, by opening up a separate window to display the address book entries, including the web service entries 130. Alternatively, a user may manually enter a web service email address into the to address input field 160, similar to addressing a conventional email message using an email address corresponding to an intended recipient.

The illustrated email composer interface 150 also includes a custom input field 162. In the depicted example, the custom input field 162 is a "symbol" field for a stock quote. As an example, the user may enter a ticker symbol for a stock in the custom input field, and address the web service request to a stock quote web service (e.g., "Stock Quote Service" at request@stokquote.com), in order to request a synchronous email reply with a current or recent stock price corresponding to the ticker symbol.

The email composer interface 150 also may include a "subject" identifier 164. In some embodiments, the subject identifier 164 is automatically populated according to the service description 126 for the requested web service 106. Other embodiments may omit the subject identifier 164.

In some embodiments, the email composer interface 150 also includes a button 166 to allow a user to enter free text to invoke the service request for the requested web service 106. When selected, the free text button 166 provides a free text input field to allow a user (e.g., a human operator, an automated computer program, etc.) to provide free text input (e.g., extensible markup language (XML) code or another type of programming code) according to the service description 126 for the requested web service 106.

Figure 5:
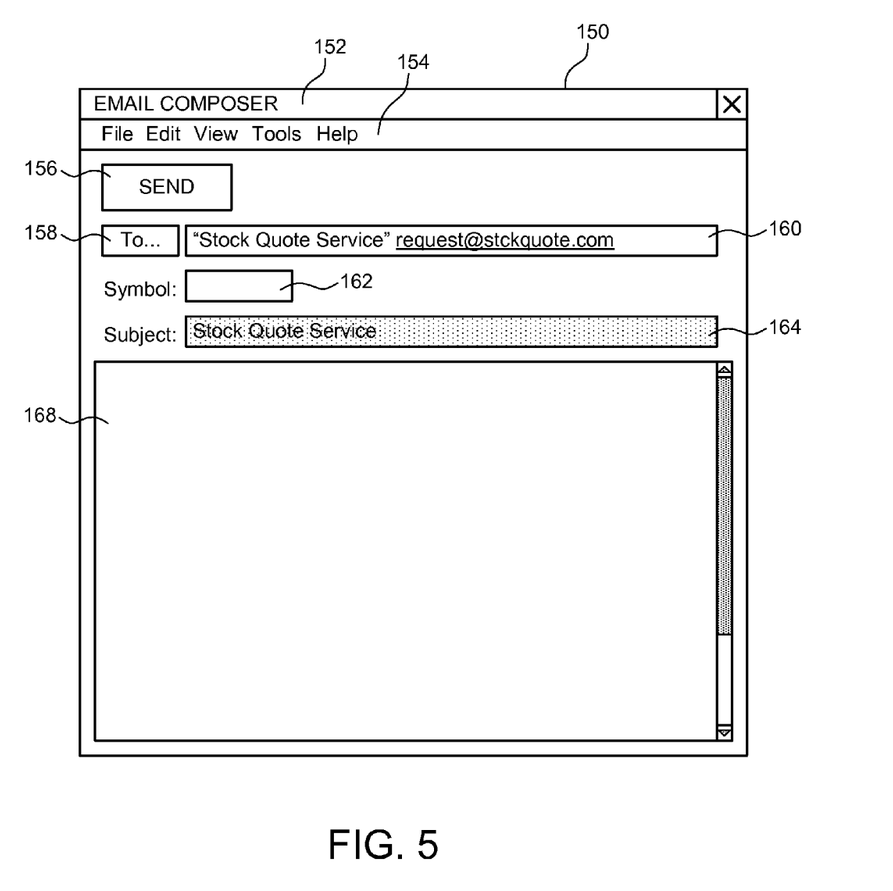
FIG. 5 depicts a schematic diagram of another embodiment of the email composer interface of FIG. 4 with a free text input field.

FIG. 5 depicts a schematic diagram of another embodiment of the email composer interface 150 of FIG. 4 with a free text input field 168. In an alternative embodiment, the email composer interface 150 may omit the free text button 166 and automatically provide the free text input field 168. In another embodiment, the free text input field 168 may be populated without making any type of selection via the email composer interface 150.

FIG. 6 depicts a schematic diagram of one embodiment of a service oriented email system 180. In general, the service oriented email system 180 system facilitates a service oriented email client application. Although certain components of the service oriented email system 180 are shown and described herein, other embodiments may implement fewer or more components and provide more or less functionality than the service oriented email system 180 shown in FIG. 6.

The illustrated service oriented email system 180 includes the email client 102, the email server 104, the adapter 114, the service registry 122, and a service network 182 with a plurality of service endpoints 184. The email client 102 is coupled to the email server by the communication channel 108 (and potentially the communication channel 144), as described above. The email server 104 is coupled to the adapter 114 by the communication channel 110 (and potentially the communication channel 142), and the adapter 114 is coupled to the service network 182 by the communication channel 188. Similarly, the email client 102 is coupled to the service registry 122 by the communication channel 124, as described above, and the service registry 122 is coupled to the service network 182 by the communication channel 190. Any or all of the communication channels may be representative of any combination of wired and/or wireless communication channels that establish any type of direct or networked communication path between the corresponding components of the service oriented email system 180.

As explained above, the email server 104 receives a service request from the email client 102 and communicates the service request to the adapter 114. The service request is invoked using an email protocol such as SMTP or another type of email protocol. The adapter 114 receives the service request from the email client 102 and communicates the service request to the corresponding web service endpoint 184 within the service network 182. The service request may be a synchronous service request, for which a reply payload is generated and returned to the email client 102, or an asynchronous service request, for which a reply payload is not anticipated or generated. For a synchronous service request, the adapter 114 receives the synchronous reply from the web service endpoint 184 and communicates the synchronous reply to the email server 104. The email server 104 then communicates the synchronous reply to the email client 102. An example of a synchronous service request is a request for a stock price quote which returns the current price of a stock. An example of an asynchronous request is a request to update user account information. In this case, the user may not require any type of response from the corresponding service endpoint 184 after the updated account information is submitted via the email client 102 to the corresponding service endpoint 184.

The email client 102 includes the service address book 128, a service analyzer 192, an email composer generator 194, and the email service requester 112. The email client 102 also includes a protocol handler 196, a user interface (UI) controller 198, and a service data transformer 200. Other embodiments of the email client 102 may include fewer or more components and/or implement more or less functionality.

In one embodiment, the email composer generator 194 (or simply email composer) generates a user input form with a custom input field 162 corresponding to the service description 126, or service information, for the web service 106. In some embodiments, the email composer 194 generates the user input form with a free text input field 168 to allow a free text input corresponding to a service request for the web service 106 in the service registry 122. The free text input field 168 may be the same as or different from the custom input field 162.

In one embodiment, the service data transformer 200 transforms a service request from the email composer 194 into a message format compatible with the service description 126, or service information, for the web service 106. Additionally, the service data transformer 200 may transform a reply payload from the message format compatible with the service description 126 to a format compatible with the email client 102 for display to a user.

In one embodiment, the user interface controller 196 generates a GUI (e.g., the GUI 150 of FIG. 4) for display on a display device. The GUI directs a user to provide input according to the user input form with the custom input field 162 corresponding to the service description 126, or service information, for the web service 106. In one embodiment, the service analyzer 192 analyzes the service information for the web service 106 and determines the custom input field 162 corresponding to the service information for the web service 106.

In one embodiment, the protocol handler 196 manages one or more email protocols and facilitates compliance of outgoing email messages with at least one of the email protocols. In one embodiment, the email service requester 112 invokes the service request via the email protocol. The service request includes the user input in the message format compatible with the service information for the web service 106.

Figure 7:
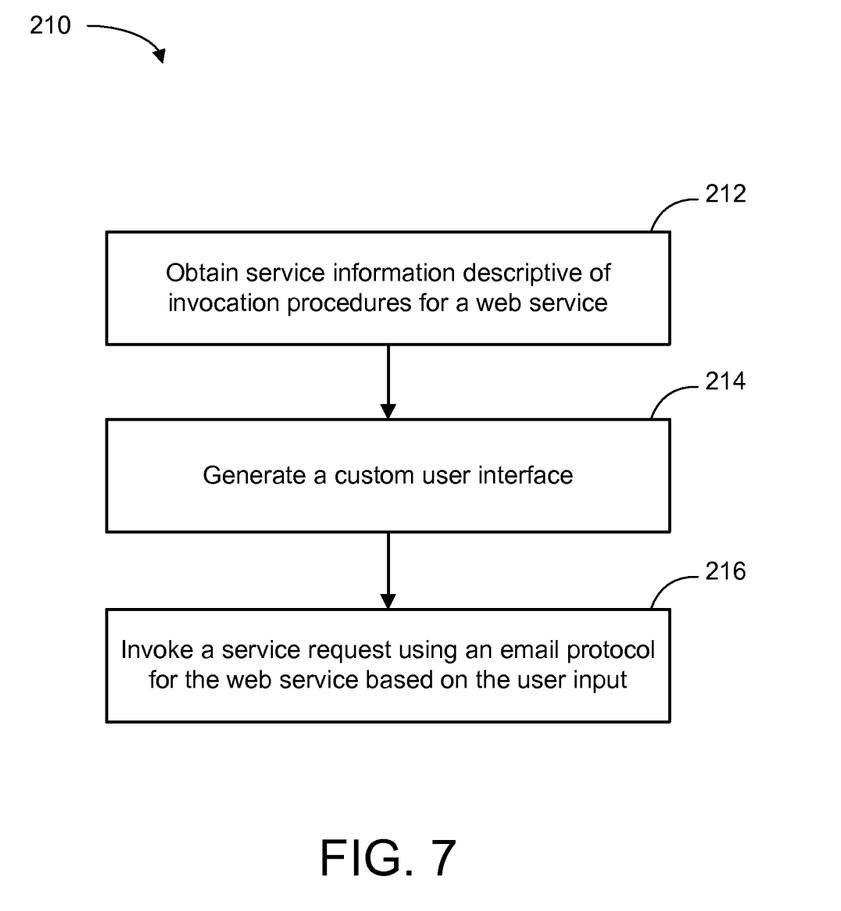
FIG. 7 depicts a schematic flow chart diagram of one embodiment of a service oriented email method.

FIG. 7 depicts a schematic flow chart diagram of one embodiment of a service oriented email method 210. For ease of explanation, the service oriented email method 210 is described with reference to the service oriented email system 180 of FIG. 6. However, some embodiments of the service oriented email method 210 may be implemented with other service oriented email systems.

In one embodiment, the service oriented email method 210 includes obtaining 212 service information descriptive of invocation procedures for a web service 106. The service information includes metadata corresponding to a custom input field 162 for the web service 106. In one embodiment, the service address book 128 accesses the service description 126 to obtain the service information. The email client 102 then generates 214 a custom user interface 150 to facilitate user input according to the custom input field 162 for the web service 106. In one embodiment, the email client 102 may implement the service analyzer 192, the email composer generator 194, and/or the user interface controller 198 to generate the custom user interface 150. After receiving user input corresponding to the custom input field 162 of the custom user interface 150, the email service requester 112 uses an email protocol to invoke 216 a service request for the web service 106 based on the user input. The depicted service oriented email method 210 then ends.

In another embodiment, the service oriented email method 210 may include one or more additional operations to implement the functionality of the service oriented email system 180 and other embodiments described herein. For example, an embodiment of the service oriented email method 210 includes storing a web service entry 130 in an address book 128 of an email client 102. The web service entry 130 includes a service request email address for invoking the service request for the web service 106. In this embodiment, generating the custom user interface 150 includes providing an email address input field 160 for user input of the service request email address corresponding to the web service 106. In another embodiment, the service oriented email method 210 includes generating the custom user interface 150 with a free text input field 168 for free text input of custom data according to the custom input field 162 for the web service 106.

Figure 8:
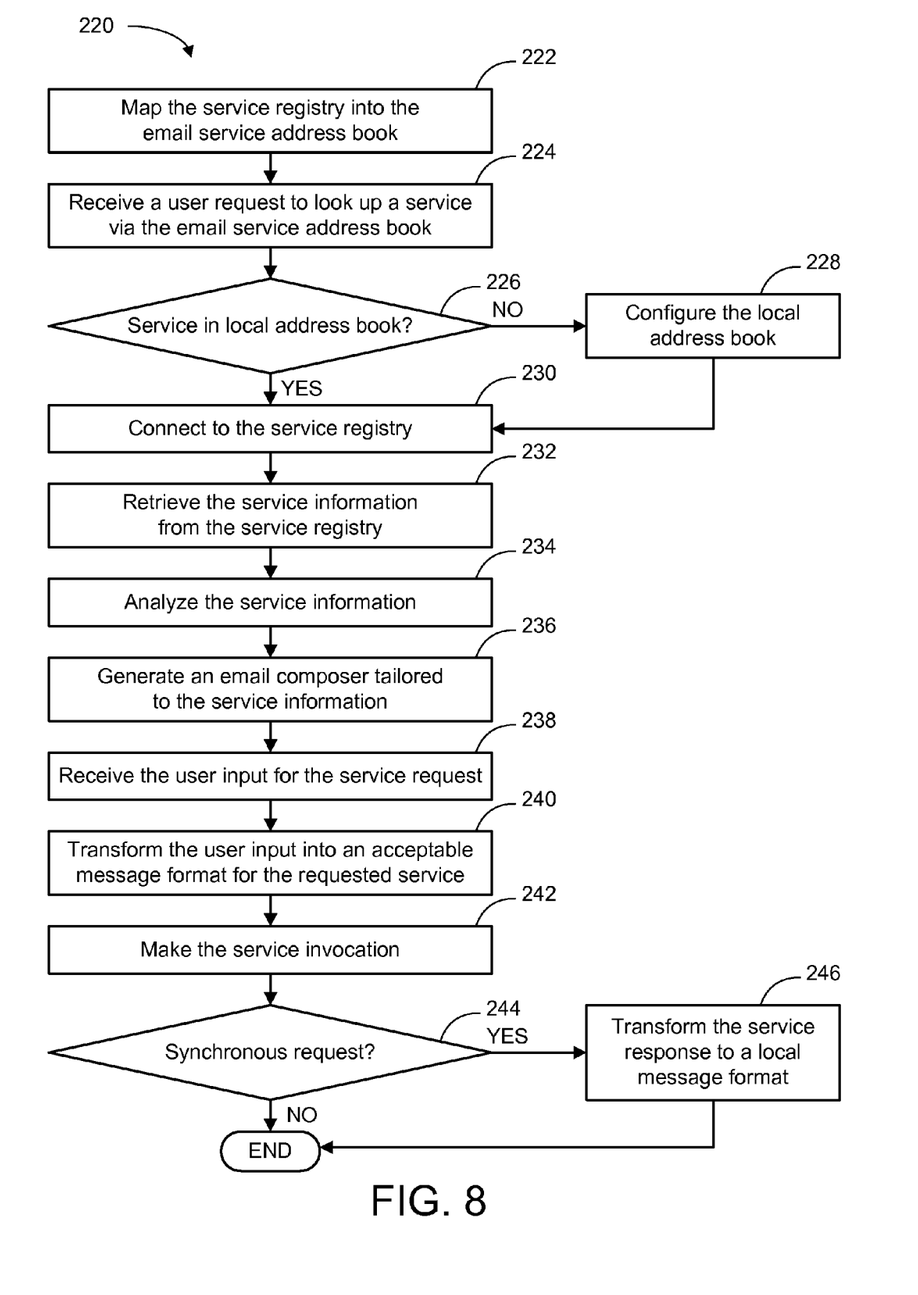
FIG. 8 depicts a schematic flow chart diagram of another embodiment of a service oriented email method.

FIG. 8 depicts a schematic flow chart diagram of another embodiment of a service oriented email method 220. For ease of explanation, the service oriented email method 220 is described with reference to the service oriented email system 180 of FIG. 6. However, some embodiments of the service oriented email method 220 may be implemented with other service oriented email systems.

In one embodiment, the service oriented email method 220 includes mapping 222 the service registry 122 into the service address book 128 of the email client 102. Subsequently, the email client 102 receives 224 a user request to look up a service via the service address book 128. In one embodiment, a user may select the to button 158 within the email composer interface 150 to initiate a lookup operation for a web service entry 130 in the service address book 128. Alternatively, the user may type in a service request email address in the email address input field 160 of the email composer interface 150.

Figure 9:
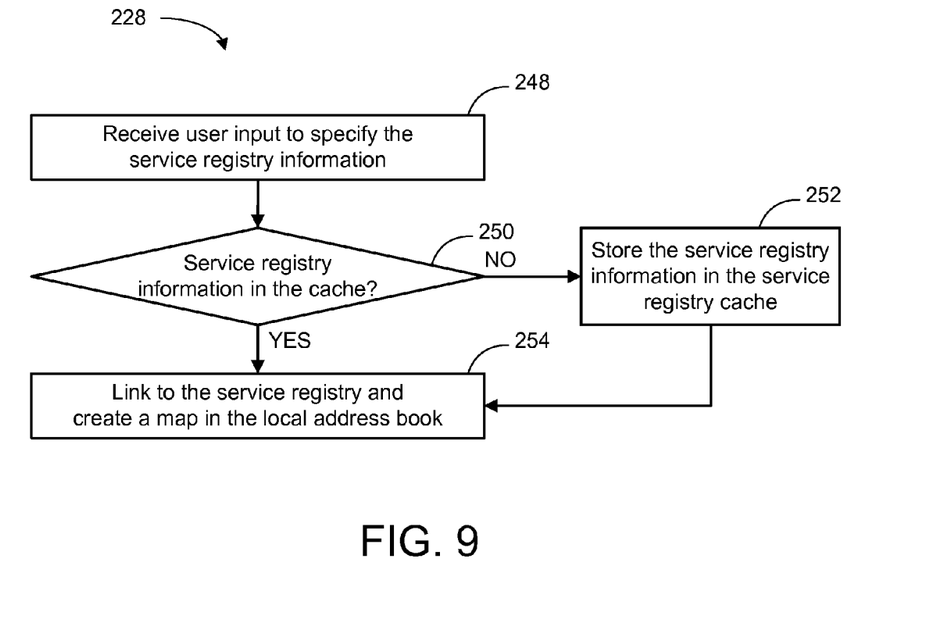
FIG. 9 depicts a schematic flow chart diagram of the configuration operation of the service oriented email method of FIG. 8.

After receiving the user request to look up a web service in the service address book 128, the email client 102 determines 226 if the service is located in the service address book 128. If the service is not located in the service address book 128, then the email client 120 may configure 228 the service address book 128. An example of the configuration operation 228 is shown in FIG. 9 and described in more detail below. Otherwise, if the service is located in the service address book 128, then the email client 102 connects 230 to the service registry 122. In particular, the email client 102 uses the web service entry 130 in the service address book 128, which points to the service description 126 in the service registry 122, to retrieve 232 the service information corresponding to the requested web service 106. The service analyzer 192 then analyzes 234 the service information (e.g., metadata for the requested web service 106) to determine how to invoke the corresponding web service 106. The email composer generator 194 then generates 236 an email composer that is tailored to the web service 106 according to the service information. The email composer may be graphically implemented as the email composer interface 150 by the user interface controller 198.

Using the email composer interface 150, a user may input the information for the service request. The user interface controller receives 238 the user input for the service request, and the service data transformer 200 transforms 240 the user information into an acceptable message format for the requested web service 106. Using this transformed data, the email service requester 112 invokes 242 the service request using an email protocol.

As explained above, the service request may be a synchronous service request. If the service request is determined 244 to be a synchronous service request, then upon receipt of the reply payload from the corresponding web service endpoint 184 the service data transformer 200 transforms 246 the service response (i.e., the reply payload) to a local message format compatible with the email client 102. The depicted service oriented email method 220 then ends.

FIG. 9 depicts a schematic flow chart diagram of the configuration operation 228 of the service oriented email method 220 of FIG. 8. For ease of explanation, the configuration operation 228 is described with reference to the service oriented email system 180 of FIG. 6 and the service oriented email method 220. However, some embodiments of the configuration operation 228 may be implemented with other service oriented email systems and methods.

In one embodiment, the email client 102 receives 248 user input to specify service registry information. In other words, a user may input service information via the email client 102. The email client 102 then determines 250 if the service registry information received from the user is already in the service registry cache 132 local to the email client 102. If the service registry information is not in the service registry cache 132, then the email client 102 stores 252 the service registry information received from the user in the service registry cache 132. After configuring the local address book 128, or if the service registry information is already in the service registry cache 132, then the email client 102 links 254 to the service registry 122 and creates a map for the service registry information in the local address book 128. The depicted configuration operation 228 then ends.

Figure 10:
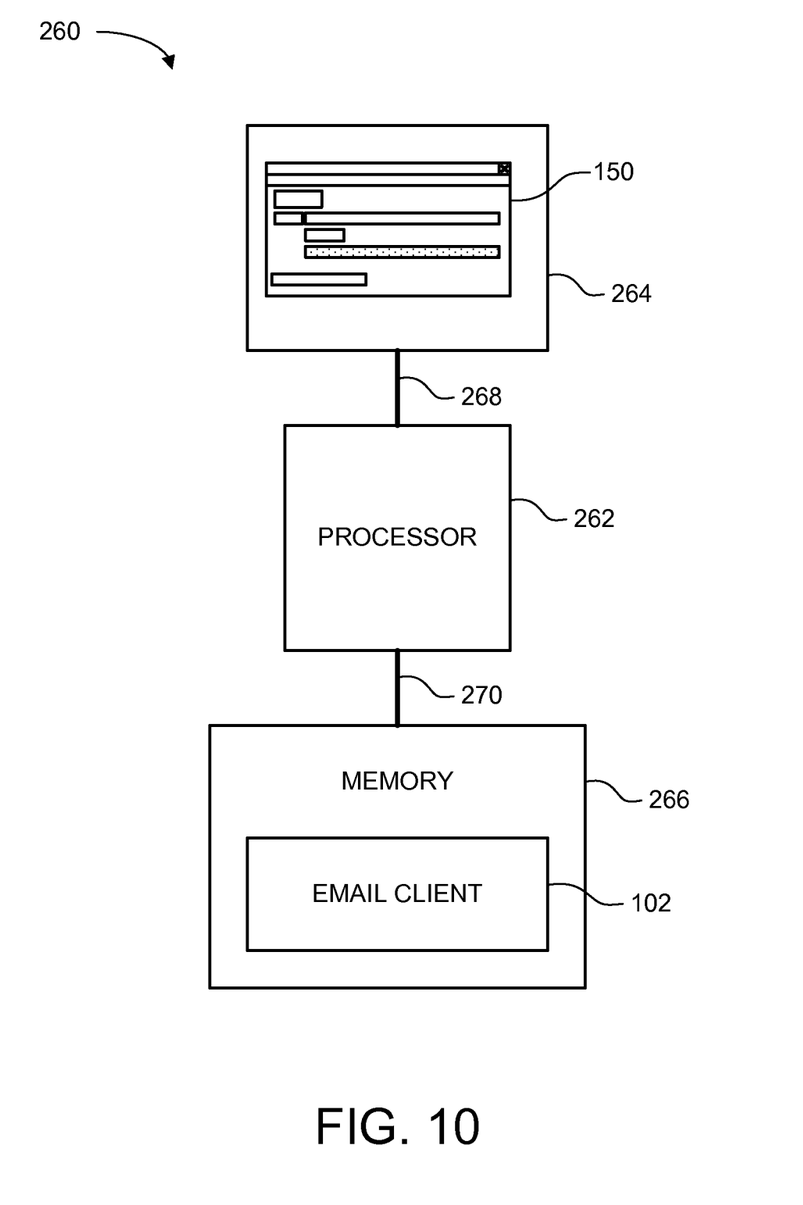
FIG. 10 depicts a schematic diagram of one embodiment of a client computer on which the service oriented email client of FIG. 6 may be implemented.

FIG. 10 depicts a schematic diagram of one embodiment of a client computer 260 on which the service oriented email client 180 of FIG. 6 may be implemented. Although the depicted client computer 260 is shown and described herein with certain components and functionality, other embodiments of the client computer 260 may be implemented with fewer or more components or with less or more functionality. Additionally, some embodiments of the client computer 260 may include similar components arranged in another manner to provide similar functionality, in one or more aspects.

The illustrated client computer 260 includes a processor 262, a display device 264, and an electronic memory device 266. In one embodiment, the processor 262 is a central processing unit (CPU). In other embodiments, the processor 262 is a graphical processing unit (GPU) or another type of processing device such as a general purpose processor, an application specific processor, or a microprocessor. In general, the processor 262 executes one or more instructions to provide operational functionality to the client computer 260. The instructions may be stored locally in the processor 262, in the electronic memory device 266, or in another data storage device. Alternatively, the instructions may be distributed across one or more devices such as the processor 262, the electronic memory device 266, or another data storage device.

In some embodiments, the display device 264 is a graphical display such as a cathode ray tube (CRT) monitor, a liquid crystal display (LCD) monitor, or another type of display device. The display device 264 is coupled to the processor 262, for example, via a data bus 268. In one embodiment, the display device 264 is configured to convey a visual representation of a email composer interface 150 described above and shown in FIGS. 4 and 5.

The electronic memory device 266 is also coupled to the processor 262. In one embodiment, the electronic memory device 266 is local memory within the processor 262. In other embodiments, the electronic memory device 266 is separate from the processor 262 and coupled to the processor 262 via one or more data, address, and/or control buses 270. An embodiment of the email client 102 may be at least partially implemented on the electronic memory device 266.

As an example of some of the embodiments described above, the email client 102 may be used to implement a service oriented email system 180 in which email is used to request and quote a stock price. Many organizations and companies provide conventional electronic services for investors to quote the current price of a particular stock. Most of these conventional electronic services are implemented using a web browser based client available to input the stock information and make request. However, similar functionality can be achieved via the service oriented email system 180 of FIG. 6, or similar systems and methods.

In one embodiment, the email client 102 includes a local service address book 128 to store a service registry location for a corresponding web service 106. This can be implemented using Universal Description Discovery and Integration (UDDI) or another protocol. The service registry information is mapped to a local address name such as "Stock Quote." Once the user initiates an email session, the email client 102 allows the user to type in the service name (e.g, "Stock quote") in the to address input field 160 of the email composer interface 150.

Subsequently, the email client 102 automatically searches for an entry in the local address book 128 for a service registry mapping. Once the email client 102 locates the service registry 122, the email client 102 makes a call to the service registry 122 and retrieves the specific information back to the email client 102. The service information can be represented in Web Services Description Language (WSDL), or another format, which contains metadata to describe the service end point address and message format information. Based on the information acquired from the service registry lookup, the email client 102 parses the WSDL file and invokes an internal code generator to dynamically create an email composer, which has a custom input field 162 such as a stock quote input field. Using the custom input field 162, the user can type in the appropriate information for the service request.

Once the input is completed, the email composer understands the input format and automatically transforms the input data into the service recognizable message. An exemplary format includes XML format in SOAP standard. Then, when the user clicks the send button 156, the email client 102 triggers the invocation of the stock quote service. Optionally, the user can also specify a reply option, either synchronously or asynchronously. In this example of a stock quote service, a synchronous response represents a real-time quote, while an asynchronous response represents a delayed quote.

From the foregoing description, it can be understood that embodiments described herein can implement many functions within a service oriented email environment. Some embodiments extend the capability of a conventional email system to be service oriented and service aware. This allows the email client to invoke services over email protocols such as SMTP. Some embodiments map the service endpoint from various service registries into the email address book of an email client. This allows the email client to retrieve the service information from the service registry. Some embodiments auto-generate the email composer or editor based on the service description. Some embodiments auto-transform the email body into the service recognizable message format. Some embodiments identify the service invocation protocol and complete the service request.

Accordingly, an embodiment of an apparatus to facilitate an email client as a web service consumer may be implemented. In one embodiment, the apparatus includes means for mapping a service endpoint from a service registry into an email address book and means for automatically generating a custom email composer interface based on a service description of the service endpoint. The custom email composer interface includes a custom input field for user input of custom data specified by the service description. The apparatus also includes means for automatically transforming the custom data into a message format compatible with the service description and means for invoking a service request for the service endpoint over an email protocol. In another embodiment, the apparatus also includes means for accommodating the email client as the web service consumer of heterogeneous web services via a single type of email adapter.

It should also be noted that at least some of the operations for the methods and/or systems described herein may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to link a web address entry of an address book in an email client to service information from a service registry. The service information corresponds to a web service. The operations also include operations to generate a user input form with a custom input field corresponding to the service information for the web service and to invoke a service request for the web service via an email message according to user input via the custom input field of the user input form.

Another embodiment of the computer program product includes an operation to store a map of the service information from the service registry in a service registry cache coupled to the address book in the email client. In another embodiment, the operations include an operation to analyze the service information for the web service and to determine the custom input field corresponding to the service information for the web service. In another embodiment, the operations include an operation to generate a graphical user interface for display on a display device. The graphical user interface directs a user to provide input according to the user input form with the custom input field corresponding to the service information for the web service. In another embodiment, the operations include an operation to transform a service request with the user input from the user input form into a message format compatible with the service information for the web service. In another embodiment, the operations include an operation to generate the user input form with a free text input field to allow a free text input corresponding to a service request for the web service in the service registry. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program that, when executed on a computer, causes the computer to perform operations comprising:
   link a web address entry of an address book in an email client to service information from a service registry, wherein the service information corresponds to a web service, wherein the service information from the service registry comprises metadata indicative of invocation procedures for the web service, wherein the service information includes metadata corresponding to a custom user input field for the web service;
   generate a user input form within an email composer, the user input form comprising the custom user input field corresponding to the service information for the web service; and
   invoke a service request for the web service via an email message according to user input via the custom user input field of the user input form of the email composer.

2. The computer program product of claim 1, wherein the computer readable program, when executed on the computer, causes the computer to perform operations to store a map of the service information from the service registry in a service registry cache coupled to the address book in the email client.

3. The computer program product of claim 1, wherein the computer readable program, when executed on the computer, causes the computer to perform operations to analyze the service information for the web service and to determine the custom user input field corresponding to the service information for the web service.

4. The computer program product of claim 3, wherein the computer readable program, when executed on the computer, causes the computer to perform operations to generate a graphical user interface for display on a display device, wherein the graphical user interface is configured to direct a user to provide input according to the user input form with the custom user input field corresponding to the service information for the web service.

5. The computer program product of claim 4, wherein the computer readable program, when executed on the computer, causes the computer to perform operations to transform a service request with the user input from the user input form into a message format compatible with the service information for the web service.

6. The computer program product of claim 1, wherein the computer readable program, when executed on the computer, causes the computer to perform operations to generate the user input form with a free text input field to allow a free text input corresponding to a service request for the web service in the service registry.

7. A system to facilitate a service oriented email client application, the system comprising:
   a service registry comprising service information, wherein the service information describes how to invoke a web service, wherein the service information from the service registry comprises metadata indicative of invocation procedures for the web service, wherein the service information includes metadata corresponding to a custom user input field for the web service;
   a service address book coupled to an email client at least partially implemented on an electronic memory device, the service address book comprising a web service entry linked to the service information for the web service in the service registry; and
   an email composer coupled to the service address book, the email composer to generate a user input form within the email composer, the user input form comprising the custom user input field, the custom user input field corresponding to the service information for the web service.

8. The system of claim 7, further comprising:
   an email server coupled to the email client, the email server to receive a service request from the email client; and
   an adapter coupled between the email server and a web service endpoint corresponding to the web service in the service registry, the adapter to receive the service request from the email client and to communicate the service request to the web service endpoint.

9. The system of claim 8, wherein the adapter is further configured to receive a synchronous reply from the web service endpoint and to communicate the synchronous reply to the email server for communication to the email client.

10. The system of claim 8, wherein the adapter comprises a Simple Mail Transfer Protocol (SMTP) adapter.

11. The system of claim 8, wherein the service request comprises an asynchronous service request.

12. The system of claim 7, further comprising a service data transformer coupled to the email composer, the service data transformer to transform a service request from the email composer into a message format compatible with the service information for the web service.

13. The system of claim 7, further comprising a user interface controller coupled to the email composer, the user interface controller to generate a graphical user interface for display on a display device, wherein the graphical user interface is configured to direct a user to provide input according to the user input form with the custom user input field corresponding to the service information for the web service.

14. The system of claim 13, further comprising a service analyzer coupled to the email composer, the service analyzer to analyze the service information for the web service and to determine the custom user input field corresponding to the service information for the web service.

15. The system of claim 7, further comprising a service registry cache coupled to the service address book, the service registry cache to store a map of the service information from the service registry in the service address book, wherein the service address book is local to the email client.

16. The system of claim 7, wherein the email composer is further configured to generate the user input form with a free text input field to allow a free text input corresponding to a service request for the web service in the service registry.

17. A system comprising:
   a plurality of service endpoints within a service network, wherein each of the service endpoints is configured to provide a web service;
   a service registry coupled to the service network, the service registry to store service information descriptive of invocation procedures for the web services corresponding to the plurality of service endpoints, wherein the service information from the service registry comprises metadata indicative of invocation procedures for the web service, wherein the service information includes metadata corresponding to a custom user input field for the web service; and an email client coupled to the service registry, the email client to invoke a service request for the web service of at least one of the plurality of service endpoints over an email protocol, the email client comprising an email composer to generate a user input form within the email composer, the user input form comprising the custom user input field, the custom input field corresponding to service information for the web service for which the service request is to be invoked by the email client.

18. The system of claim 17, further comprising an address book coupled to the email client, the address book to store a plurality of web service entries, wherein the plurality of web service entries correspond to the plurality of service endpoints.

19. The system of claim 17, further comprising:

an email server coupled between the email client and the service network, the email server to receive the service request from the email client; and a Simple Mail Transfer Protocol (SMTP) adapter coupled between the email server and the service network, the SMTP adapter to receive the service request from the email service using the email protocol and to communicate the service request to the service endpoint corresponding to the web service indicated in the service request.

20. The system of claim 17, further comprising:

a service analyzer coupled to the address book of the email client, the service analyzer to analyze the service information for the web service and to determine the custom user input field corresponding to the service information for the web service;

a user interface controller coupled to the email composer, the user interface controller to generate a graphical user interface for display on a display device, wherein the graphical user interface is configured to direct a user to provide input according to the custom user input field corresponding to the service information for the web service;

a service data transformer coupled to the user interface controller, the service data transformer to transform the user input from the user interface controller into a message format compatible with the service information for the web service; and an email service requestor coupled to the service data transformer, the email service requestor to invoke the service request via the email protocol, wherein the service request comprises the user input in the message format compatible with the service information for the web service.

21. A method comprising:

obtaining service information descriptive of invocation procedures for a web service, wherein the service information comprises metadata corresponding to a custom user input field for the web service, wherein the service information from the service registry comprises metadata indicative of invocation procedures for the web service, wherein the service information includes metadata corresponding to the custom user input field for the web service;

generating an email composer, the email composer comprising a user input form, the user input form comprising the custom user input field;

generating a custom user interface on a display to facilitate user input according to the custom user input field for the web service; and using an email protocol to invoke a service request for the web service based on the user input.

22. The method of claim 21, further comprising storing a web service entry in an address book of an email client, the web service entry comprising a service request email address for invoking the service request for the web service, wherein generating the custom user interface further comprises providing an email address input field for user input of the service request email address corresponding to the web service.

23. The method of claim 21, wherein generating the custom user interface further comprises providing a free text input field for free text input of custom data according to the custom user input field for the web service.

24. An apparatus to facilitate an email client as a web service consumer, the apparatus comprising:

an email composer for mapping a service endpoint from a service registry into an email address book;

a user interface controller for automatically generating a custom email composer interface based on a service description of the service endpoint, wherein the custom email composer interface comprises a user input form, the user input form comprising a custom user input field for user input of custom data specified by the service description, wherein the service description comprises metadata indicative of invocation procedures for the web service, wherein the service information includes metadata corresponding to the custom user input field for the web service;

a service data transformer for automatically transforming the custom data into a message format compatible with the service description; and an email service requestor for invoking a service request for the service endpoint over an email protocol.

25. The apparatus of claim 24, wherein the email client is configured to act as the web service consumer of heterogeneous web services via a single type of email adapter.

* * * * *